(12) United States Patent
Schlarman

(10) Patent No.: US 8,478,628 B1
(45) Date of Patent: Jul. 2, 2013

(54) COMPONENT BASED RISK SYSTEM

(75) Inventor: Steven Gerard Schlarman, Eureka, MO (US)

(73) Assignee: EMC Corporation, Hopkinton, MA (US)

( * ) Notice: Subject to any disclaimer, the term of this patent is extended or adjusted under 35 U.S.C. 154(b) by 559 days.

(21) Appl. No.: 12/324,002

(22) Filed: Nov. 26, 2008

Related U.S. Application Data

(60) Provisional application No. 60/990,727, filed on Nov. 28, 2007.

(51) Int. Cl.
*G06Q 10/00* (2012.01)
*G06Q 40/00* (2012.01)

(52) U.S. Cl.
USPC .................................... 705/7.28; 705/7.11

(58) Field of Classification Search
USPC ................................. 705/7.11–7.42
See application file for complete search history.

(56) References Cited

U.S. PATENT DOCUMENTS

| | | | | |
|---|---|---|---|---|
| 5,615,109 | A * | 3/1997 | Eder | 705/7.12 |
| 6,983,221 | B2 * | 1/2006 | Tracy et al. | 702/181 |
| 7,260,549 | B2 | 8/2007 | Spielmann | |
| 7,383,155 | B2 * | 6/2008 | Rosam et al. | 702/182 |
| 7,809,595 | B2 * | 10/2010 | Breslin et al. | 705/7.28 |
| 2003/0229525 | A1 | 12/2003 | Callahan | |
| 2005/0197952 | A1 * | 9/2005 | Shea et al. | 705/38 |
| 2006/0106700 | A1 * | 5/2006 | Boren et al. | 705/35 |
| 2006/0179476 | A1 * | 8/2006 | Challener et al. | 726/4 |
| 2007/0022025 | A1 * | 1/2007 | Litman et al. | 705/30 |
| 2007/0101432 | A1 | 5/2007 | Carpenter | |
| 2007/0130191 | A1 | 6/2007 | Dawson | |
| 2007/0203925 | A1 * | 8/2007 | Sandler et al. | 707/100 |
| 2008/0077530 | A1 * | 3/2008 | Banas et al. | 705/50 |

OTHER PUBLICATIONS

International Standard ISO/EIC 27001, First Edition, 2005.*

* cited by examiner

*Primary Examiner* — Jason Dunham
*Assistant Examiner* — Richard Scheunemann
(74) *Attorney, Agent, or Firm* — BainwoodHuang

(57) ABSTRACT

System and method for risk assessment of compliance are disclosed. A database is provided, which contains mapped compliance data components related to regulations, requirements, policies and standards, controls, and assets. Users can specify the weighting of the data components based on the user's business requirements. Manual and automated assessments are used to measure and determine the state of compliance of assets, such as people, processes, and technology. In particular, assessments may be performed on the standards and controls related to people, processes, and technology. Various compliance and risk indices are computed based on the compliance status of the standards and controls. Reports and analysis using the compliance data components and the compliance and risk indices are provided to quantify compliance risks and to assess overall compliance.

16 Claims, 17 Drawing Sheets

Reference Index Input

Reference Navigation — Go To: PCI-DSS v1.1

- RegulationID: 6
- RegulationName: PCI-DSS v1.1
- RegulationOverview: The Payment Card Industry (PCI) Data Security Standard offers a single approach to safeguarding sensitive data for all card brands. CISP compliance is a requirement for all merchants and service providers that store, process, or transmit Visa cardholder data. Many other card companies operating

Reference Section: (800)

- RegulationSectionID: 416
- RegulationID: 6
- RegulationSectionNumber: 1.1
- RequirementDescription: Establish logical controls for managing secure network traffic and ensuring its availability, confidentiality and integrity.

Set Reference Index: (802)

Reference Index: ○0 ○1 ○2 ○3 ○4 ○5 ○6 ○7 ⦿8 ○9 ○10 (804)
N/A  Low  ———————————  High

Associated Standards: (806)

| SID | Standard Summary |
|-----|------------------|
| 550 | Routers and firewalls must not accept external connections that appear to be coming from int |
| 551 | Network connections to the Internet must be tightly firewalled to prevent unauthorized entry |
| 552 | All connections between networks and the Public Internet should utilize an application proxy |
| 558 | Only TCP/IP based protocols are allowed to cross network boundaries unencrypted. |
| 559 | Network services must be disabled unless a specific business reason for the service is needed |

Record: 1 of 137

Controls Index Input

Control Domain Navigation

| ⏮ | ▼ | ▲ | ⏭ | | Go To: | Windows 2003 Domain Controller |

Control Domain ID: 22
Control Domain: Windows 2003 Domain Controller
Technical Control:

Control Category: Auditing, Logging and Monitoring

Control ID: 1322

Control Statement: Logs containing Active Directory auditing information should be protected from guest access for servers.

Control Procedure: The Prevent local guests group from accessing Application log, Prevent local guests group from accessing Security log, and Prevent local guests group from accessing System log settings may be enabled in the Event Log settings within the appropriate Group Policy Object for a critical server.

Control Implication: Audit logs may contain sensitive information about the system and may be used to compromise the system. In addition, if logs are accessible by guests, it would be possible to read sensitive information which could potentially be used to escalate privileges.

Set Control Index:

Control Index: ○ 0  ○ 1  ○ 2  ○ 3  ○ 4  ● 5  ○ 6  ○ 7  ○ 8  ○ 9  ○ 10 — 902
N/A         Low ——————————————— High

Control Risk Index

| Total of SII: | CRI: |
|---|---|
| 1000 | 5000 |

Standards related to this Control:

| SID | Standard Summary | | SII |
|---|---|---|---|
| 472 | Logs must be protected against unauthorized manipulation. | | 250 |
| 490 | [Information Custodian]s must ensure that default permissions of files created within systems restrict | | 750 |

Process Assessment Index Input

Reference Navigation
|◀ ◀ ▶ ▶|  Go To: [      ]

AssessmentID: 100
Name: BCP Assessment
Weight: 2

Assessment Questions:

QueryID: 10000

Assessment Question: Does each of the organizations Business Continuity Plans allow for restoration of business operations in the required timeframe after an interruption of service or disaster?

Control Requirement:

Rating: 1

Linked SID: 118

Standard Statement: All Business Continuity Plans (BCP) must restore or maintain business operations in the required time following any interruption of service or disaster. Therefore, the following elements must be included in the plan: failover conditions or requirements necessary to invoke the plan; emergency and operational procedures for all essential business

SII: 58

Set Question Index:
Question Index  ○0 ○1 ○2 ○3 ○4 ⦿5 ○6 ○7 ○8 ○9 ○10
N/A    Low ---------------------- High Record: |◀ ◀ [1 of 15] ▶ ▶*|  ✖ No Filter  [Search]

Standard Index Detail

Standards Navigation

| | Go To: | |
|---|---|---|

StandardID: 3

StdSummary: The access privileges of developers to production libraries must restrict access.

StdStmt: <P>The access privileges of developers to production libraries must restrict access so they will only be permitted to copy source code from production into their development area, and write or move modified code into a staging library.</P>

Standard Impact Index

| Standard Reference Index: | 20 |
|---|---|
| Standard Control Index: | 115 |
| Standard Impact Index: | 135 |

| Average SII | 60.19 | # of SIDs with SII: | 3 |
|---|---|---|---|
| Minimum SII | 5 | | |
| Maximum SII | 1839 | | |

Reference Index Detail:

Standard Reference Index: 20    Number of Reference Sections Mapped: 4

| Reference Name | Reference Section | Reference Section Name | Reference Requirement | Reference Index |
|---|---|---|---|---|
| COBIT 4.0 | DS - Delivery and Support | Manage the Configuration | Manage configuration of all IT assets and ensure effective change management practices are in place to protect IT asset configuration | 5 |
| ISO-IEC 27001 | 12.5 | Security in development and support process | Project or support environments should be controlled appropriately and only changes authorized by the project managers should be applied in these environments | 5 |
| ISO-IEC 27001 | 12.4.3 | Access to program source code | Program source code and related information should be protected from unauthorized access, modification and deletion | 5 |
| ISO-IEC 27001 | 12.1 | Security requirements of information systems | Security requirements should be identified and agreed before development or implementation of information systems | 5 |

Control Index Detail:

Standard Control Index: 115    Number of Controls Mapped: 23

| Control Domain | Control Statement | Control Index |
|---|---|---|
| ACF2 | Access to program libraries and data sets should be restricted to authorized programs and users. | 5 |
| Apache Web Server 2.2 | File system permissions on web server configuration and executable files should be properly restricted. | 5 |
| Application Development | Application and Security programming code should be clearly documented. | 5 |
| Application Development | In-house developed applications should follow an approved System Development Life-Cycle (SDLC) which inclu | 6 |

FIG. 11

Standards Based Assessment

Assessment Navigation

Assessment ID: 1 ☑ ComplianceAssessment

AssessmentName: Code Review Assessment

Queries

Query Navigation

QID 6

Standard: Vendor supplied software must be maintained at a level  supported by the v... — 1300

Standard Summary: Vendor supplied software must be maintained at a level  supported by the vendor.

Standard Statement: Vendor supplied software must be maintained at a level  supported by the vendor. Exceptions may be requested as needed based upon business requirements. All exceptions must be approved by [Information Systems Department] and [Security Organization]. — 1302

SII 205

Query: Has all vendor supplied software been upgraded to the level or version supported by the vendor?

Query Index  ○0  ○1  ○2  ⊙3  ○4  ○5  ○6  ○7  ○8  ○9  ○10
Low — — — — — — — — — — — — — — High — 1304

Answer Set:

| | Answer | N/A | Multiplier | ComplianceResult |
|---|---|---|---|---|
| | All software supported | | 0 | Pass |
| | Some software supported | | 0.5 | Pass |
| | No software support available | | 1 | Fail |
| * | | | | |

FIG. 13

COMPONENT BASED RISK SYSTEM

CROSS-REFERENCE TO RELATED APPLICATIONS

This application claims the benefit of provisional application Ser. No. 60/990,727, filed Nov. 28, 2007, entitled: "Component Based Risk Measurement"—the contents of such application being hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Field of the Invention

The present invention generally relates to compliance with corporate governance and business requirements. More particularly, embodiments of the present invention relate to the measurement, assessment, and computation of risks associated with compliance with corporate governance and business requirements for organizations, companies, and business enterprises.

2. Background Art

In today's highly regulated business environment, companies have to comply with various external regulations, laws, and mandates, such as the Sarbanes-Oxley Act, which requires companies to implement business controls to ensure proper financial reporting processes. In addition, many companies have implemented internal business policies and standards based on industry standards and "best practices," such as ISO:27001, which provides companies with a framework to implement information security processes. It is important for companies to be able to measure and assess their compliance with such external and internal business requirements.

One process for assessing compliance with such business requirements is to first categorize compliance-related information into three components: (1) References—for external regulations and internal business requirements; (2) Standards—for internal policies and standards to meet such regulations and business requirements; and (3) Controls—which are specific actions or implementations to meet such Standards.

Next, References that are relevant to the business are identified and collected. References, which are business requirements, can come from many sources. For example, regulatory requirements are placed on businesses through legislative and industry regulations. Internal requirements in the form of service level agreements and business partner agreements define specific targets and objectives for businesses. Industry "best practices" and frameworks provide further recommended requirements and procedures for many businesses. The sum of all of these requirements defines the overall business and risk objectives of an organization, which are documented in References.

Standards, which are internal policies and standards for addressing such References, are established and mapped to References. Specifically, policies and standards are formulated and established to meet the desired References. Each company has its own set of policies and standards to meet regulations and business requirements.

Controls for meeting Standards are documented and mapped to Standards. There are many different types of Controls, depending on whether the Controls are for business processes, technology, or people/roles within the organization. Controls are the particular actions, procedures, or implementations necessary to address the Standards associated with the resources or assets.

Once Controls are defined and put in place, they are tested and the results are collected to determine the state of compliance. Controls can be tested manually, in the form of a questionnaire or survey, or automatically, using various hardware devices and software applications. However, merely testing Controls does not fully assess the state of compliance. While individual Controls may have a "pass" or "fail" response or an "on" or "off" status, the overall status of the Controls, by themselves, is not sufficient to quantify the "risks" associated with the non-compliance of business requirements. Risk as used herein refers to the gap between compliance of certain business requirements and the actual state of the controls and standards that are implemented to meet such requirements. In other words, risk, from a compliance standpoint, is the gap, or residual, between the desired state of compliance and the actual state of compliance. It is important for businesses to identify, measure, and assess the amount of residual risk that exists in their corporate compliance programs.

Furthermore, users need to be able to "weigh in" on the importance of various References, Standards, and Controls in determining the risks associated with compliance in their business environment.

Therefore, there is a need for a risk assessment system that can measure and assess the state of compliance and quantify the risks associated with compliance with business requirements.

BRIEF SUMMARY OF THE INVENTION

In accordance with the present invention, the disadvantages and problems set forth in the foregoing Background Art have been substantially reduced or eliminated.

In one embodiment, a component-based risk system comprises a database having data components related to compliance in the format of References, Standards, Controls, and Assets, assessment tools for measuring the state of the Controls and Standards, user interface for inputting weights related to data components, a set of programs to compute risk and compliance indices that assess the state of compliance, and a server to perform such computation and to interface with the database and user input.

The present invention provides the following compliance assessment method: (1) receive data components that define and describe an organization's compliance requirements and mapping of such components to the organization's assets and resources; (2) receive user-specified weighting for data components; (3) perform assessments on assets and resources to determine their state of compliance; and (4) compute compliance risk indices to assess risks associated with the current state of compliance.

The primary objective of the present invention is to allow business to assess the risks associated with a corporate compliance program and to provide compliance risk indices for quantitative analysis.

Another objective of the present invention is to determine the risk based on the gap between actual operations and the stated corporate goals and objectives of the business.

Another object of the present invention is to allow users to specify the weighting of the data components for use in the compliance computation, based on the importance of the components to the users.

Yet another object of the present invention is to allow users to define business requirements and internal controls and to assign importance to such requirements and controls.

Other objects and technical advantages are readily apparent to one skilled in the art from the following figures, descriptions, and claims.

BRIEF DESCRIPTION OF THE SEVERAL VIEWS OF THE DRAWINGS

FIG. 7 is a screenshot showing a graphical user interface for mapping of References to Standards in accordance with one embodiment of the present invention.

FIG. 8 is a screenshot showing the data input for the Reference Index in accordance with one embodiment of the present invention.

FIG. 9 is a screenshot showing the data input for the Control Index in accordance with one embodiment of the present invention.

FIG. 10 is a screenshot showing the data input for the Query Index in accordance with one embodiment of the present invention.

FIG. 11 is a screenshot showing an example Standard Impact Index calculation in accordance with one embodiment of the present invention.

FIG. 13 is a screenshot showing a Standards-based Assessment in accordance with one embodiment of the present invention.

Like elements in the various figures are denoted by like reference numerals for consistency.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the following description is to be understood as being broad, teaching disclosure directed to persons of skill in the appropriate arts, and not as limiting upon the present invention.

Compliance Components

Figure 1:
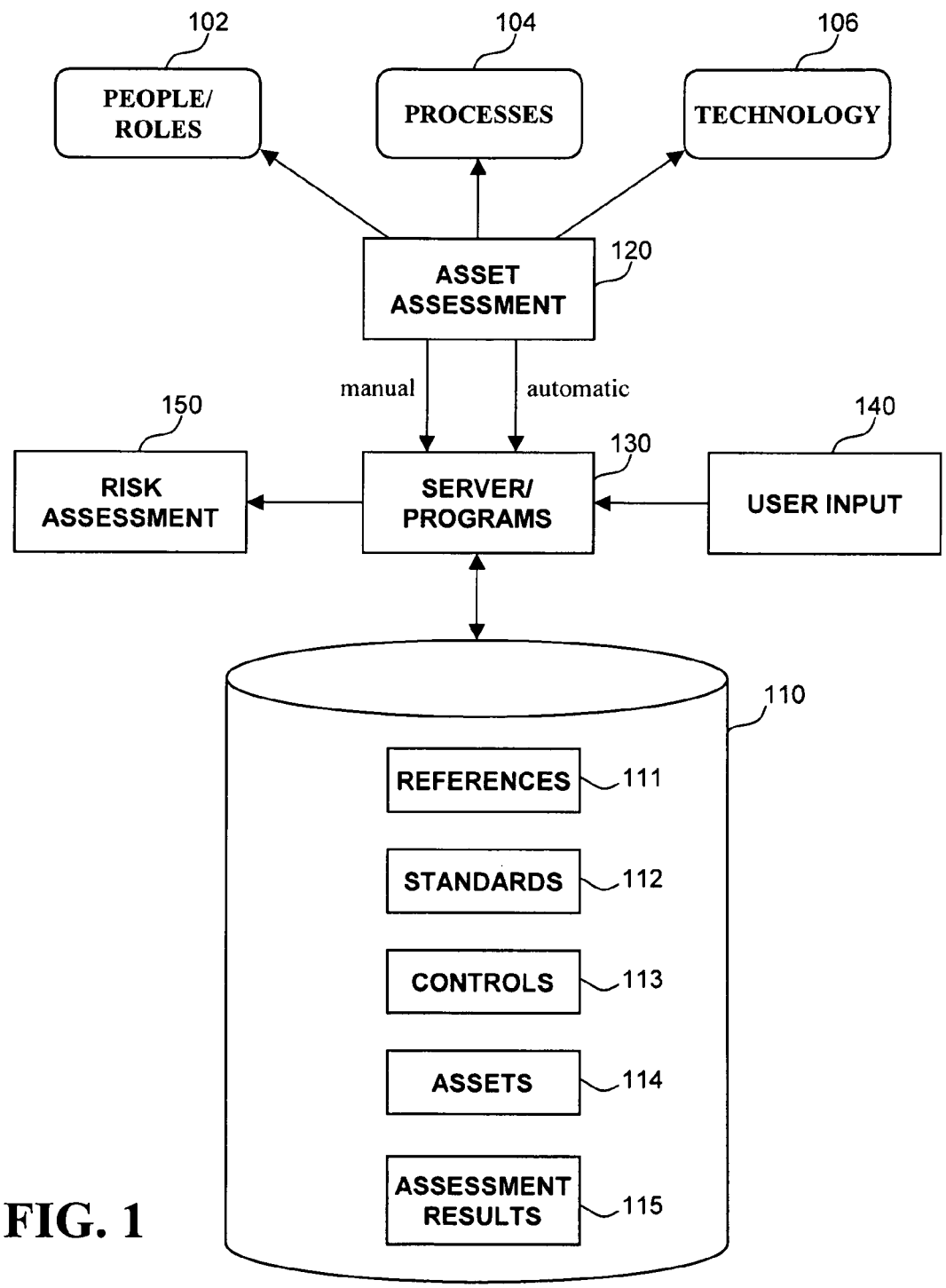
FIG. 1 is a high-level overview of the system components of the present invention in accordance with one embodiment.

FIG. 1 is a high-level overview of the system components of the present invention in accordance with one embodiment. The present invention assesses compliance of business resources and assets such as People 102, Processes 104, and Technology 106. Database 110 contains compliance specific information regarding People 102, Processes 104, and Technology 106 organized as data components in the form of References 111, Standards 112, Controls 113, and Assets 114. Asset Assessment 120 performs assessment of People 102, Processes 104, and Technology 106. Asset Assessment 120 may be performed manually or automatically and the results are stored in Assessment Results 115 in the Database 110. Server computer 130 and its programs are used to interface Asset Assessment 120 with Database 110. Server 130 also interfaces with users via User Input 140. Once all of the asset assessment results 115 and user input 140 have been received, Server 130 performs the computation in Risk Assessment 150 and provides compliance indices for compliance assessment.

Risk, as used in the present invention, is defined as: Risk=F (business requirements, internal practices), where business requirements are the discrete set of constraints and expectations needed to meet business objectives, and internal practices are the actions and activities implemented within an organization to meet such business requirements. Risk is calculated as the gap or difference between business requirements and the current state of internal practices designed to meet those requirements. The purpose of assessment is to determine the current state of the organization with respect to the internal practices implemented to meet the desired business requirements.

Figure 2:
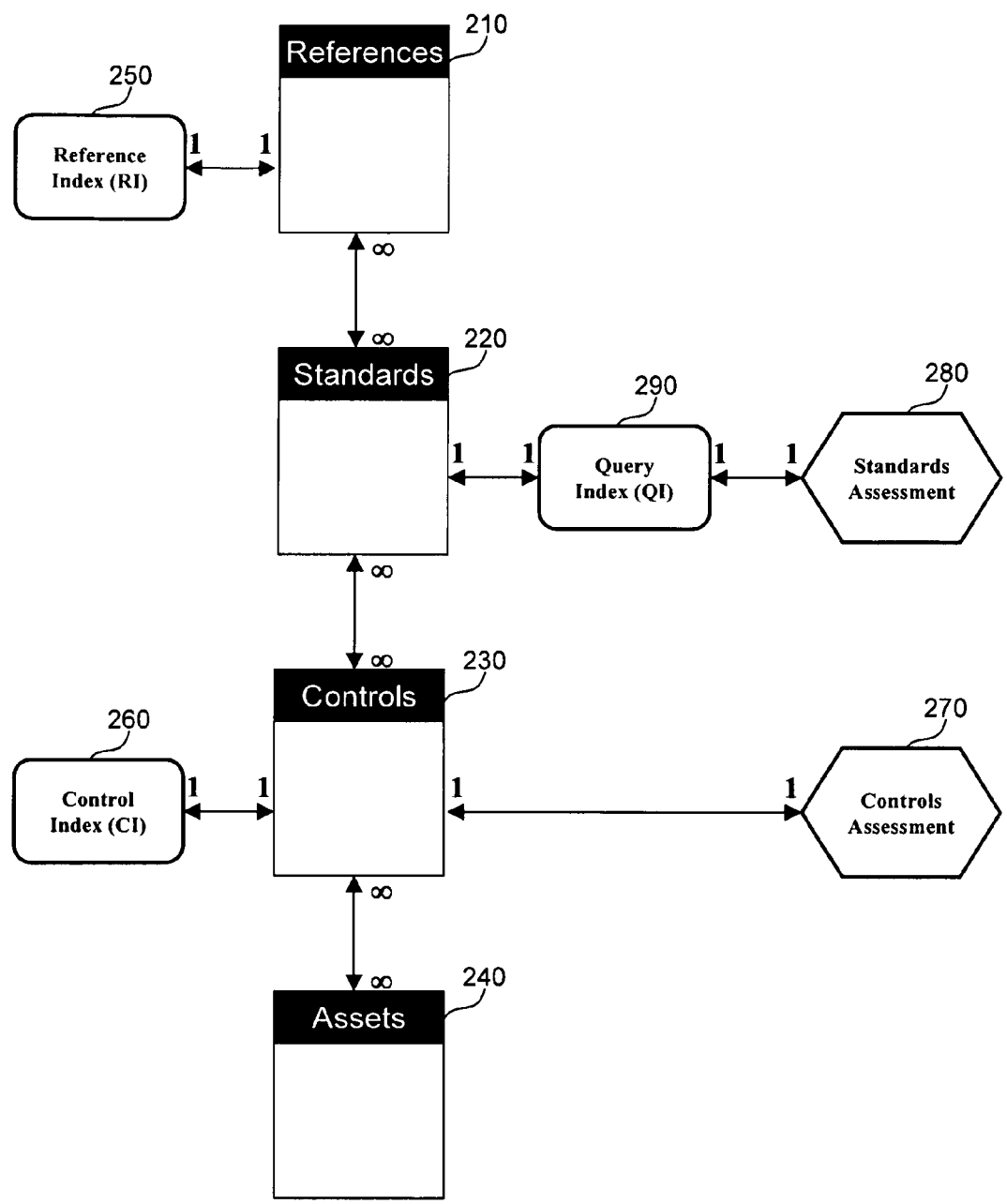
FIG. 2 illustrates the data components of the present invention and the relationship between the data components and their associated weight indices.

FIG. 2 illustrates the data components of the present invention and the relationship between the data components and their associated weight indices, which specify the importance of data components vis-à-vis the user's business environment. The key data components are References 210, Standards 220, Controls 230, and Assets 240. References 210 contain information concerning relevant laws and regulations, industry standards, best practices, and business requirements. Example References 210 include the Sarbanes-Oxley Act, HIPAA, COBIT, and ISO. Users can set the weight (based on importance) of each Reference by specifying a Reference Index 250 for each Reference.

Standards 220 contain internal business policies and standards for implementing References. Standards 220 are mapped to References 210, linking internal policies and standards to business requirements. An example Standard is "All users must have a unique username and password for computer access." In certain instances, a Standard may have one or more queries associated with it, the query providing the information necessary to verify that the Standard has been met. For example, a Standard may require that "testing of business continuity contingency plans be performed on an annual basis" and the associated query provides, "has Department XYZ tested the business continuity contingency plans this year?" There is a many-to-many mapping relationship between Standards 220 and References 210, i.e., multiple Standards can be mapped to one Reference 210, and one Standard can be mapped to multiple References. For example, Standards A and B are mapped to Reference X, and Standard B is also mapped to Reference Y.

Controls 230 contain specific actions, procedures, or implementations for meeting Standards 220. User can set the weight of each Control by specifying a Control Index 260 for each Control. Controls 230 are mapped to Standards 220, defining how specific actions from people, processes, and technology are used to meet business policies and standards. There is a many-to-many mapping relationship between Controls 230 and Standards 220, i.e., multiple Controls can be mapped to one Standard, and one Control can be mapped to multiple Standards.

Assets 240 are specific business resources or assets such as people, functional or organizational roles, processes, or technology (e.g., computers, databases, operating systems, etc.). Assets 240 are mapped to Controls 230, and there is a many-to-many mapping relationship between Assets 240 and Controls 230, i.e., multiple Controls can be mapped to one Asset, and one Control can be mapped to multiple Assets. Assets may also be mapped to Standards. Typically, Assets 240 related to people, functional roles, and processes are mapped to Standards.

In summary, the mapping of References 210 to Standards 220 to Controls 230 to Assets 240 provides the ability for an organization to link a specific requirement to a set of standards, which in turn are implemented by a set of controls that are associated with one or more assets. The linking of the content is on a granular level and permits a many-to-many relationship between the data. For example, a requirement may be linked to many standards, and a standard may be implemented by multiple controls, which may apply to multiple assets.

Viewed from a corporate compliance standpoint, the present invention enables an organization to identify regulations and business requirements (defined as References 210) and implement internal policies and standards (Standards 220), which require specific actions and implementations (Controls 230) that address such internal policies and standards in order to manage the risks associated with such business requirements. Controls are then applied to specific operational resources and assets (Assets 240) of the organization to assure corporate compliance.

Compliance Assessment

In one embodiment of the present invention, two types of compliance assessments may be performed. Referring to FIG. 2, a Controls-based assessment, called a Controls Assessment 270, is used to measure and assess compliance of Controls 230, and a Standards-based assessment, called a Standards Assessment 280, is used to measure and assess compliance of Standards 220. In a Controls Assessment 270, a user can specify which Controls to measure, and an assessment is performed on the specified Controls to determine whether the Controls have met their corresponding Standards in the user's business environment.

When a Standards Assessment 280 is selected, a Query Index 290 is assigned to each Standard to be assessed. The Query Index 280 allows a user to specify the weight of the Standards to be assessed. The Standards Assessment 280 determines whether the specified Standards have met their corresponding References in the user's business environment.

Figure 3A:
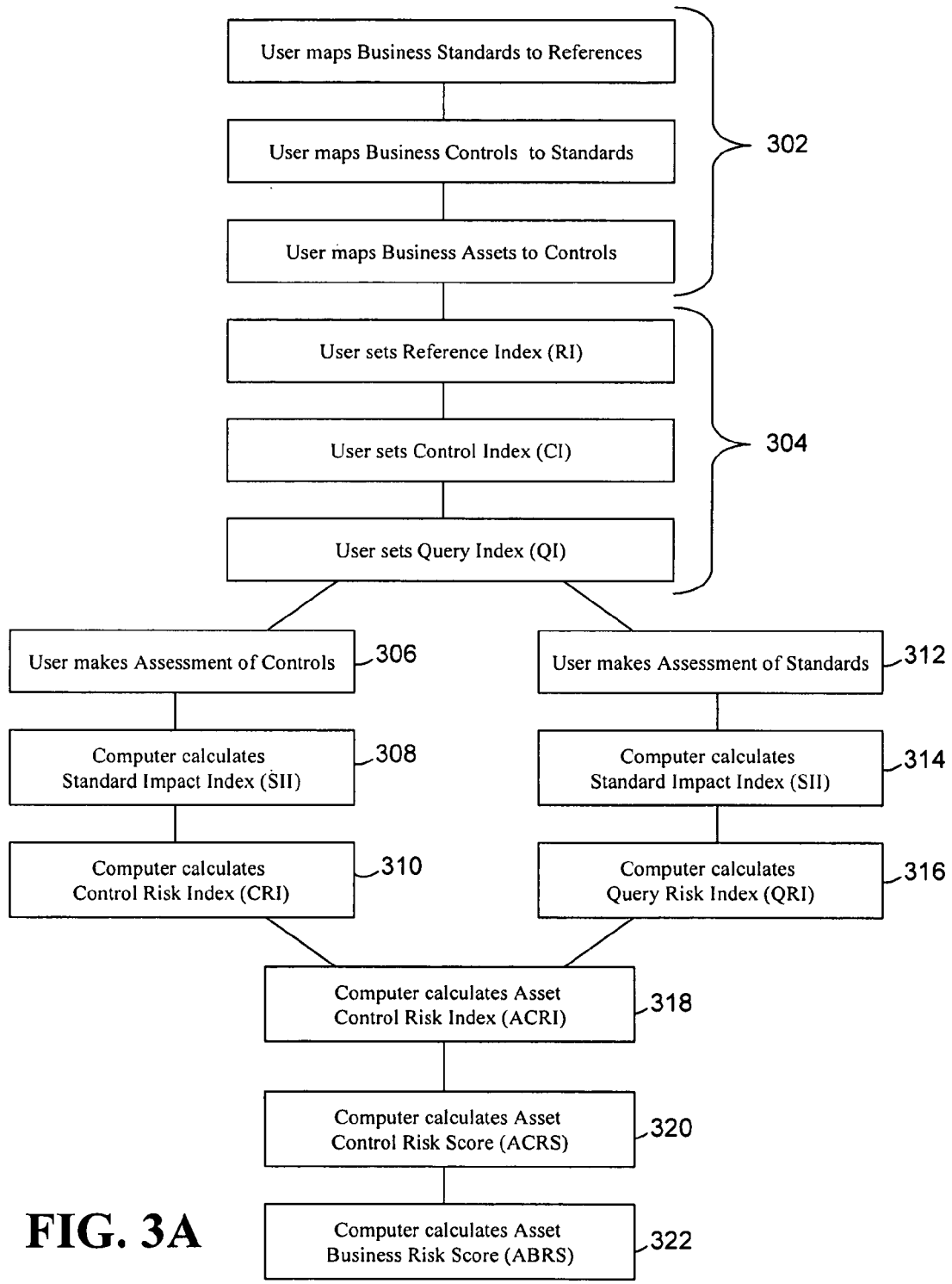
FIG. 3A is a high-level overview of the key steps of the present invention.

FIG. 3A is a high-level overview of the key steps of the present invention. First, compliance component data is mapped in step 302: Standards are mapped to References; Controls are mapped to Standards; and Assets are mapped to Controls. Second, in step 304, the user can assign weights to References, Standards, and Controls depending on their importance in the user's business environment. Third, asset compliance assessments are performed. Finally, computation of compliance risks is performed and various compliance indices are provided to assess the state of compliance of the user's business environment.

For a Controls Assessment 306, a set of Control-related indices is calculated. In step 308, a Standard Impact Index is calculated as the sum of the Reference Indices plus the sum of the Controls Indices mapped to the Standard. The Standard Impact Index represents the impact of a particular Standard in a business environment relative to the other Standards in the environment. A Standard mapped to more or higher weighted Reference Sections and/or more or higher weighted Controls will result in a higher Standard Impact Index, indicating a greater importance within the organization. In step 310, the Control Risk Index is calculated using the Standard Impact Index and the Control Index. The Control Risk Index provides a quantitative measure of the risk associated with the failure of a Control.

Similarly, for a Standards Assessment 312, a set of Standards-related indices is calculated. In step 314, a Standard Impact Index is calculated. In step 316, a Query Risk Index is calculated using the Standard Impact Index and the Query Index and represents a quantitative measure of the risk associated with the failure of a Standard. As a group, the Standard Impact Index, the Control Risk Index, and the Query Risk Index represent the risks associated with non-compliance.

Next, a common set of compliance assessment indices is calculated based on either the Controls-related indices or the Standards-related indices, depending on which assessment is being performed. An Asset Control Risk Index 318 is calculated to using the Control Risk Indices of all the Controls mapped to the Asset. An Asset Control Risk Score 320 calculated to represent a percent number using the Asset Control Risk Index and the total of the Controls that were identified through testing to have failed or not met implementation requirements. The Asset Control Risk Score is a quantitative figure signifying the risk affecting the asset, wherein 100% represents a total failure of all the controls, and a 0% represents no failure of any control. An Asset Business Risk Score 322 is calculated to represent the business risk based on the individual value of the asset as designated by an Asset Impact Value.

The Control Risk Indices, Asset Control Risk Index and Asset Control Risk Scores can be used in various ways to provide quantitative risk reporting. One example is to create a composite analysis across multiple assessments to combine Asset Control Risk Indices and Asset Impact Values into one composite Asset Business Risk Score.

Controls Assessment

Figure 3B:
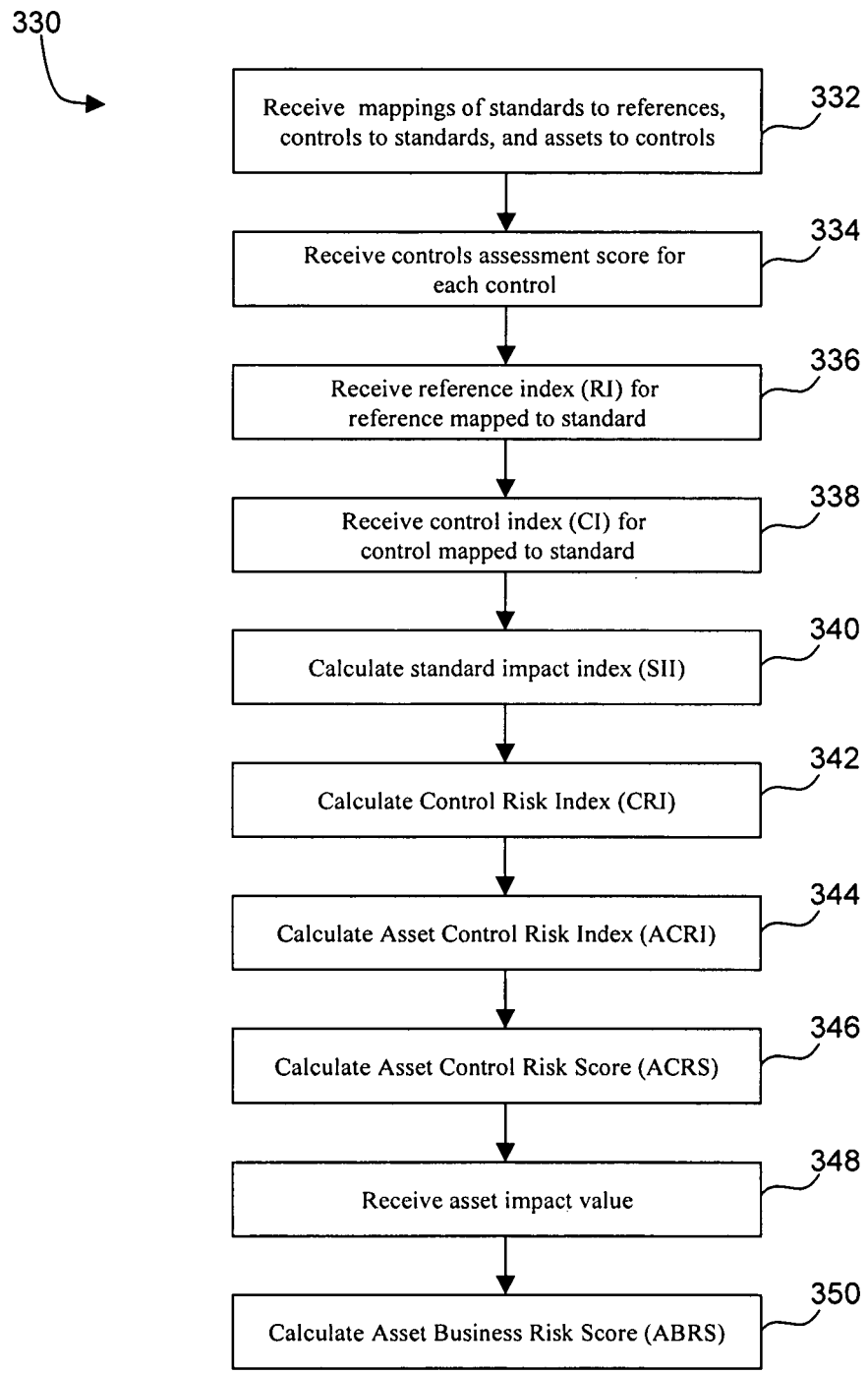
FIG. 3B is a flow chart showing the specific steps and sequence for performing a Controls Assessment in accordance with one embodiment of the invention.

The sequence of the steps in FIG. 3 will vary depending on the type of assessment being performed. To illustrate, FIG. 3B is a flow chart 330 showing the specific steps and sequence for performing a Controls Assessment in accordance with one embodiment of the invention. First, in step 332, based on which Controls to assess, mapping of relevant compliance data is provided, i.e., mapping of Standards to References, mapping of Controls to Standards, and mapping of Assets to Controls. In step 334, an assessment score for each Control to be assessed is received. In one embodiment, assessment scores can be scaled from 0 to 1, with 0 for passing, 1 for failing, and a score between 0 and 1 for other conditions. For example, a score of 0.25 can be set for a failed assessment that have been accepted by the business as an acceptable, known risk. A score of 0.5 can be set for an assessment that is indeterminate or under investigation. A score of 0.75 can be set for an assessment that has not been reviewed. Assessment scores can also be in the form of a gray scale, whereby the user defines the answer set/range for each assessment.

In step 336, a Reference Index (RI) is received for each Reference mapped to a Standard. The RI is a weight set by the user based on the importance of the Reference in the user's business environment. In one embodiment, the RI is scored on a scale of 1 to 10. In step 338, a Control index (CI) is received for each Control mapped to a Standard. The CI is a weight set by the user on the importance of the Control in the user's business environment. In one embodiment, the CI is scored on a scale of 1 to 10.

In step 340, a Standard Impact Index (SII) is calculated to measure the impact of a Standard in a business environment. For a particular Standard, the SII is the sum of the RIs mapped to the Standard plus the sum of the CIs mapped to the Standard (in other words, SII=sum (RI)+sum (CI)). In step 342, a Control Reference Index (CRI), which measures the importance/impact of a Control on a business environment, is calculated for each Control mapped to a Standard. For a particular Control, the CRI is the CI of the Control multiplied by the sum of the SII of the Standards mapped to the Control (in other words, CRI=CI*sum (SII)).

In step 344, Asset Control Risk Index (ACRI) is calculated, which measures individual risk associated with a Control of an asset. ACRI is equal to the CRI of the Control multiplied by the control assessment score (also known as the multiplier for control state). In step 346, the computer calculates an Asset Control Risk Score (ACRS), which is a percentage relative to the risk affecting the asset. The higher the percentage, the more risk on the asset. The ACRS is equal to the sum of the ACRIs divided by the sum of the CRIs for all the Controls. In step 348, an asset impact value for each asset is provided. The asset impact value can be calculated using a user-defined formula. In step 350, the computer calculates an Asset Business Risk Score (ABRS), which represents the business risk based on the asset. The ABRS is equal to the asset impact value multiplied by the ACRS.

Standards Assessment

Figure 3C:
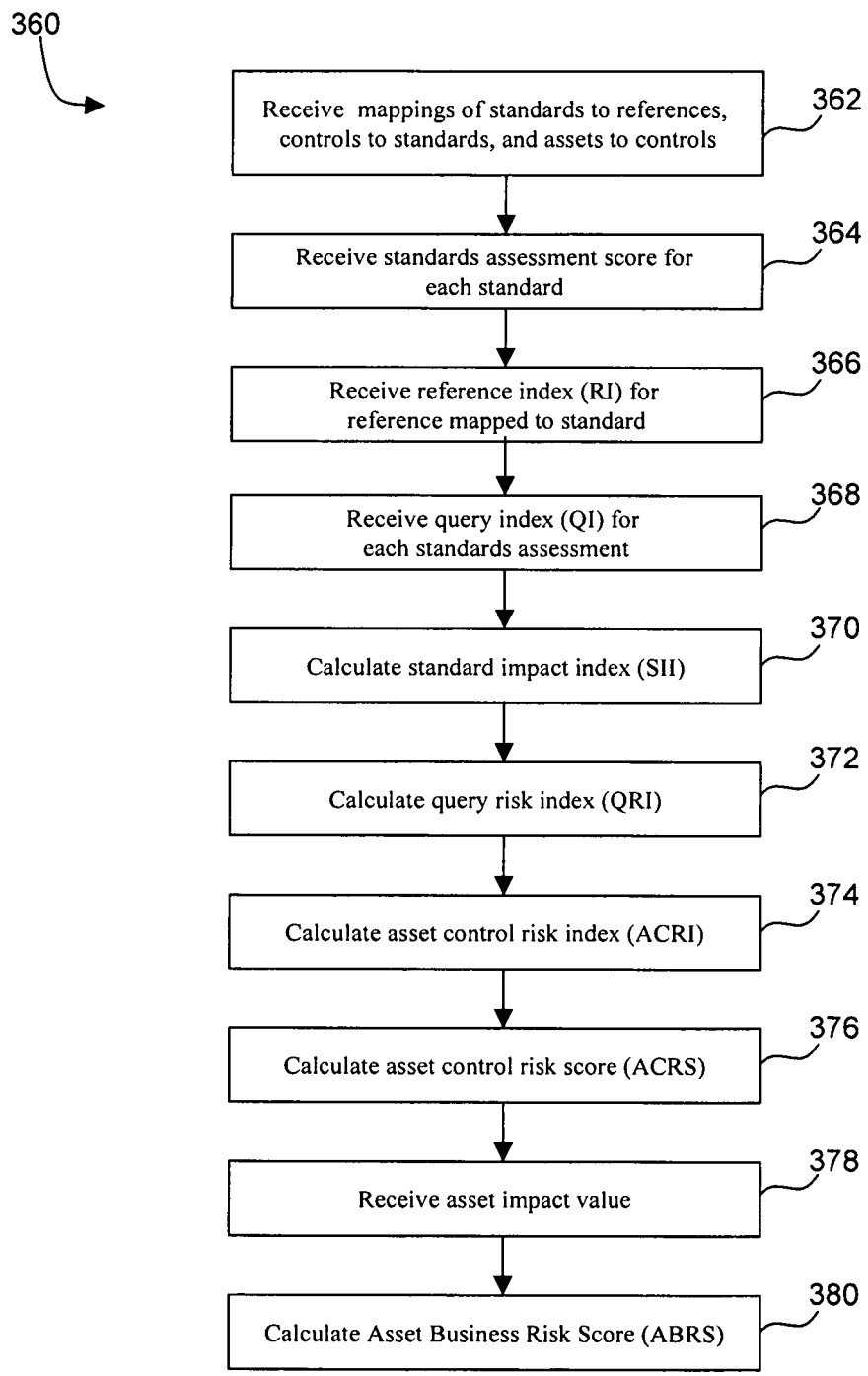
FIG. 3C is a flow chart showing the specific steps and sequence for performing a Standards assessment in accordance with one embodiment of the invention.

FIG. 3C is a flow chart 360 showing the specific steps and sequence for performing a Standards assessment in accordance with one embodiment of the invention. In step 362, based on which Standards are to be assessed, mapping of relevant compliance data is received, i.e., mapping of Standards to References, mapping of Controls to Standards, and a mapping of Assets to Controls. In step 364, an assessment score is received for each Standard to be assessed. In step 366, a Reference Index (RI) is received for each Reference mapped to a Standard. The RI is a weight set by the user based on the importance of the Reference in the user's business environment. In one embodiment, the RI is scored on a scale of 1 to 10. In step 368, a Query Index (QI) is received for each Standard to be assessed. The query index is a weight set by the user on the importance of the Standard. In one embodiment, the query index is scored on a scale of 1 to 10.

In step 370, a Standard Impact Index (SII) is calculated, which measures the impact of a Standard in a business. For a particular Standard, the SII is the sum of the RIs mapped to the Standard plus the sum of QIs mapped to the Standard (i.e., SII=sum (RI)+sum (QI)). In step 372, a Query Risk Index (QRI) is calculated, which measures the importance of a standards assessment. For a particular standard assessment, the query risk index is equal to the QI of the Standard multiplied by the SII of the particular Standard.

In step 374, the computer calculates an Asset Control Risk Index (ACRI), which measures individual risk associated with a Standard on an asset. For a Standards Assessment, ACRI is equal to the QRI of the Standard multiplied by the standards assessment score. In step 376, an Asset Control Risk Score (ACRS) is calculated, which is a percentage relative to the risk affecting the asset. The higher the percentage, the more compliance risk to the asset. The ACRS is equal to the sum of the ACRI divided by the sum of the QRI for all the Standards. In step 378, an asset impact value is received for each asset. The asset impact value can be calculated using a user-defined formula. In step 380, an Asset Business Risk Score (ABRS) is calculated, which represents the business risk based on the asset. The ABRS is equal to the asset impact value multiplied by the ACRS.

System Overview

Figure 4A:
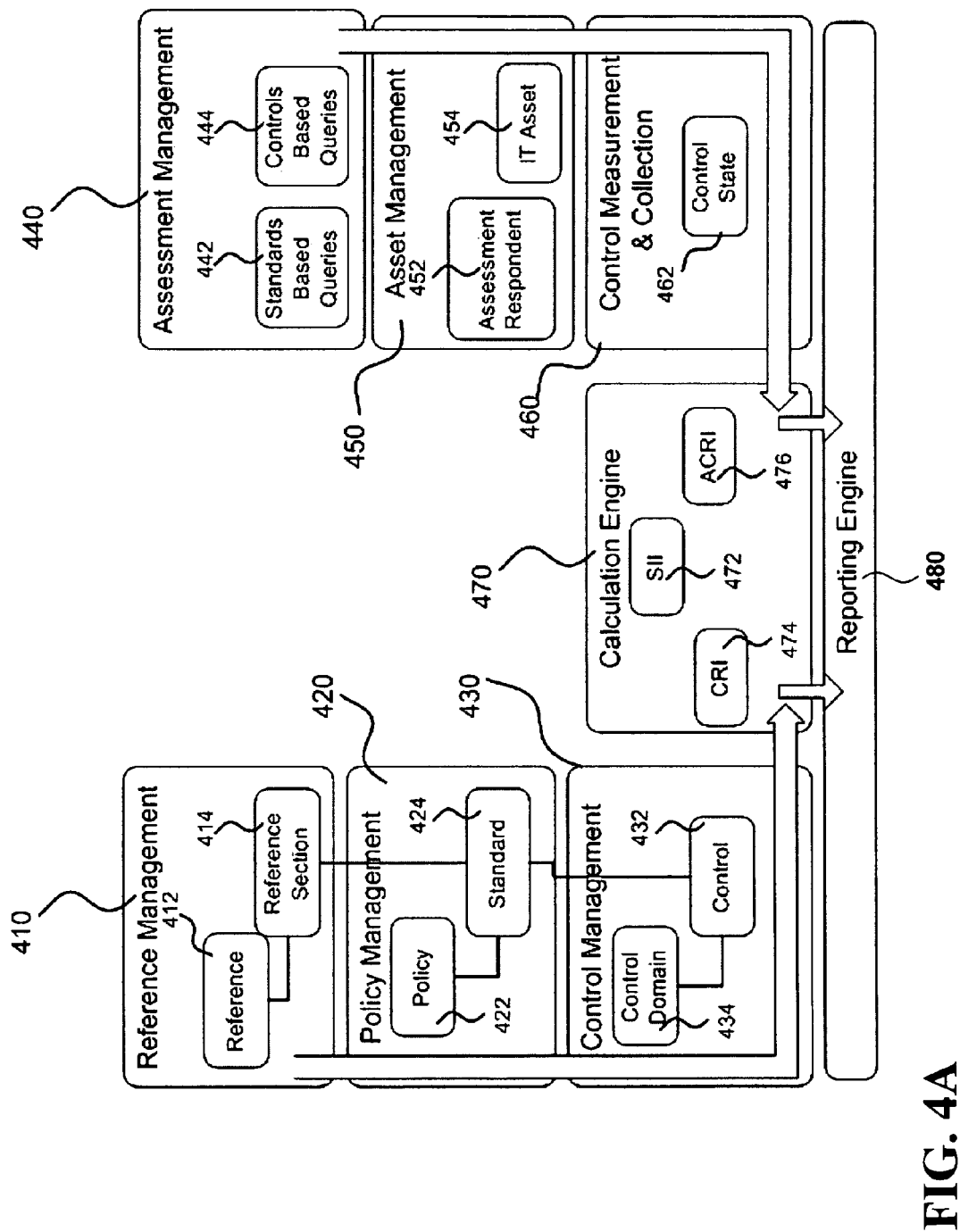
FIG. 4A shows the key sub-systems of the present invention in accordance with one embodiment.

FIG. 4A shows the key sub-systems of the present invention in accordance with one embodiment. Three sub-systems are used to define and provide mapping of data components: Reference Management 410, Policy Management 420, and Control Management 430. Reference Management 410 manages the References data component, which contains the regulatory and business requirements that an organization desires to meet. References comprise Reference Sets 412 and Reference Sections 414. A Reference Set is a set of business requirements, industry standards, regulations, and best practices; a Reference Section is an individual member of a Reference Set. Reference Management 410 includes all the functions necessary to create and manage the References, including the ability to create, copy, edit Reference Sets 412 and Reference Sections 414.

Policy Management 420 manages the Standards data component, which contains the internal policies and standards used by an organization to meet the desired business requirements as provided by References. A Policy 422 is typically a high-level, broad mandate, whereas a Standard 424 is detailed and implementation specific. Policy Management 420 includes all the functions necessary to create and mange the Standards, including the ability to publish Standards for review and approval. Standards are mapped to References, and Reference Management 410 contains the functionality to create, modify, and maintain the mapping of Standards to References.

Control Management 430 manages the Control data component, which contains the detailed actions, procedures, and implementations to meet the policies and standards set forth in Standards. Typically, a Control is a specific action or activity taken to prevent, mitigate, obstruct, block or hinder a potential risk. Control Management 430 comprises Controls 432 and Control Domains 434. A Control Domain is a set of Controls grouped together to address risks associated with certain assets or resources. To illustrate, for the resource Windows 2003 Domain Controller, a Control Domain called Control Domain for Windows 2003 Domain Controller is provided, which contains various Controls that are used to measure the Windows 2003 Domain Controller. Control Management 430 includes all the functions necessary to create and mange Controls 432 and Control Domains 434, including the ability to publish Controls 432 and Control Domains 434 for review and approval. Control Management 430 provides the functionality necessary to map Controls to Standards, including the ability to add and modify mapping between Controls and Standards.

Three sub-systems are used to measure and assess the state of compliance: Assessment Management 440, Asset Management 450, and Control Measurement and Collection 460. Assessment Management 440 manages the various assessments that measure operational controls against defined or desired control expectations. Assessments can be Controls-based or Standards-based and are comprised of queries that prompt respondents (either people or technology) for their compliance status. The Assessment Management 440 contains Standards Based Queries 442 and Controls Based Queries 444, and the functions necessary to create assessments and the selection of Standards or Controls that define the assessment.

Asset Management 450 manages the respondents to which the assessments pertain. Assessment Respondents 452 may be people (like employees, agents, contractors) who respond to the queries of an assessment. Respondents may be technology, i.e., IT Assets 454; in which case, assessments are directed to the platforms, computers, or devices embodying the technology. For example, to assess the current availability of a storage disk, a query is directed to the storage disk controller to determine the current status of the disk (e.g., is it online?). Asset Management 450 provides the ability to define assets, associate assets to Control Domains, and assign respondents responsible for the assets.

Control Measurement & Collection 460 manages the process to send assessments to respondents or to collect assessments from external sources and providers. Assessment may be performed manually or automatically. For manual assessment, web-based survey and questionnaire may be used. Assessment may be automated by receiving assessment data from external sources and applications. Determining Control State 462 is the main output of this sub-system. The Control state 462 is the result of testing against Controls or Standards within a specific assessment. Control Measurement & Collection 460 includes the functions necessary to distribute, collect, and track manual assessments or integrate and incorporate compliance data from external assessment technologies for automated assessment.

Once the assessment results have been collected, Calculation Engine 470 performs the necessary computation for determining the various risk compliance indices. The three main indices that are computed by the Calculation Engine are Standard Impact Index (SII) 472, Control Risk Index (CRI) 474, and Asset Compliance Risk Index (ACRI) 476. Calculation Engine 470 includes all the necessary functions to calculate the risk compliance indices and to provide data to Reporting Engine 480. Finally, Reporting Engine 480 manages all reporting from the sub-systems. Reporting Engine 480 can create various reports and GUI user views regarding References, Standards, Controls, and Assets with respect to impact, risks, and compliance. Some of the reports include risk analysis, overall compliance reporting, quantitative compliance analysis, and composite analysis across multiple assessments.

Figure 4B:
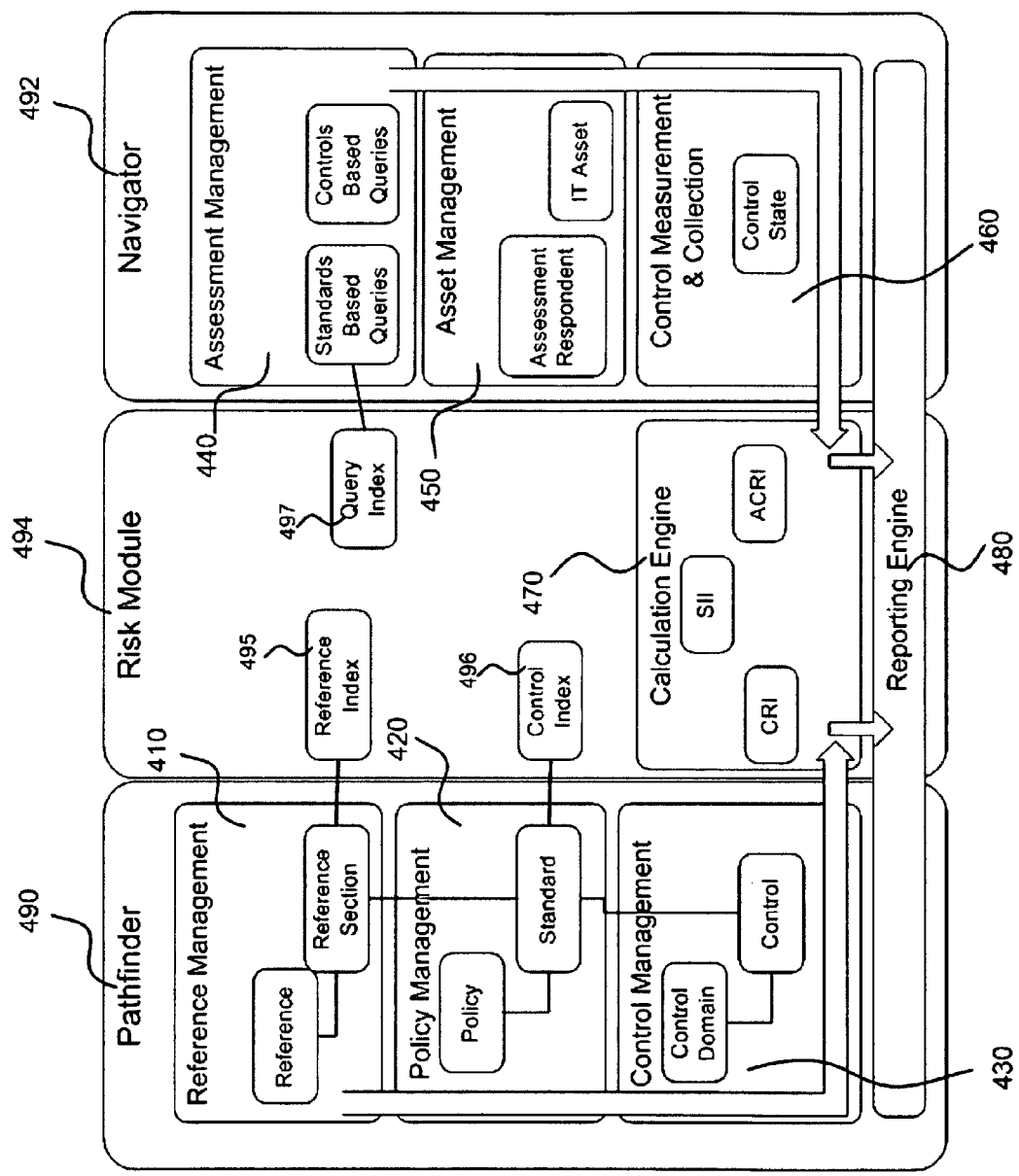
FIG. 4B shows one embodiment of the present invention using commercially available applications.

FIG. 4B shows one embodiment of the present invention using commercially available applications. Brabeion Software Corporation markets a software application called Pathfinder 490, which performs the functions of Reference Management 410, Policy Management 420, and Control Management 430. Another software application from Brabeion Software Corporation called Navigator 492 can perform the functions of Assessment Management 440, Asset Management 450, and Control Measurement and Collection 460. A Risk Module 494 connects Pathfinder 490 and Navigator 492. In one embodiment, Risk Module 494 is implemented using Microsoft Access 2007 and connects to the databases supporting Pathfinder 490 and Navigator 492. Risk Module 494 allows users to specify Reference Index 495 for each Reference, Control Index 496 for each Control, and Query Index 497 for each Standard to be assessed. Risk Module 494 includes Calculation Engine 470 and Reporting Engine 480.

Figure 5:
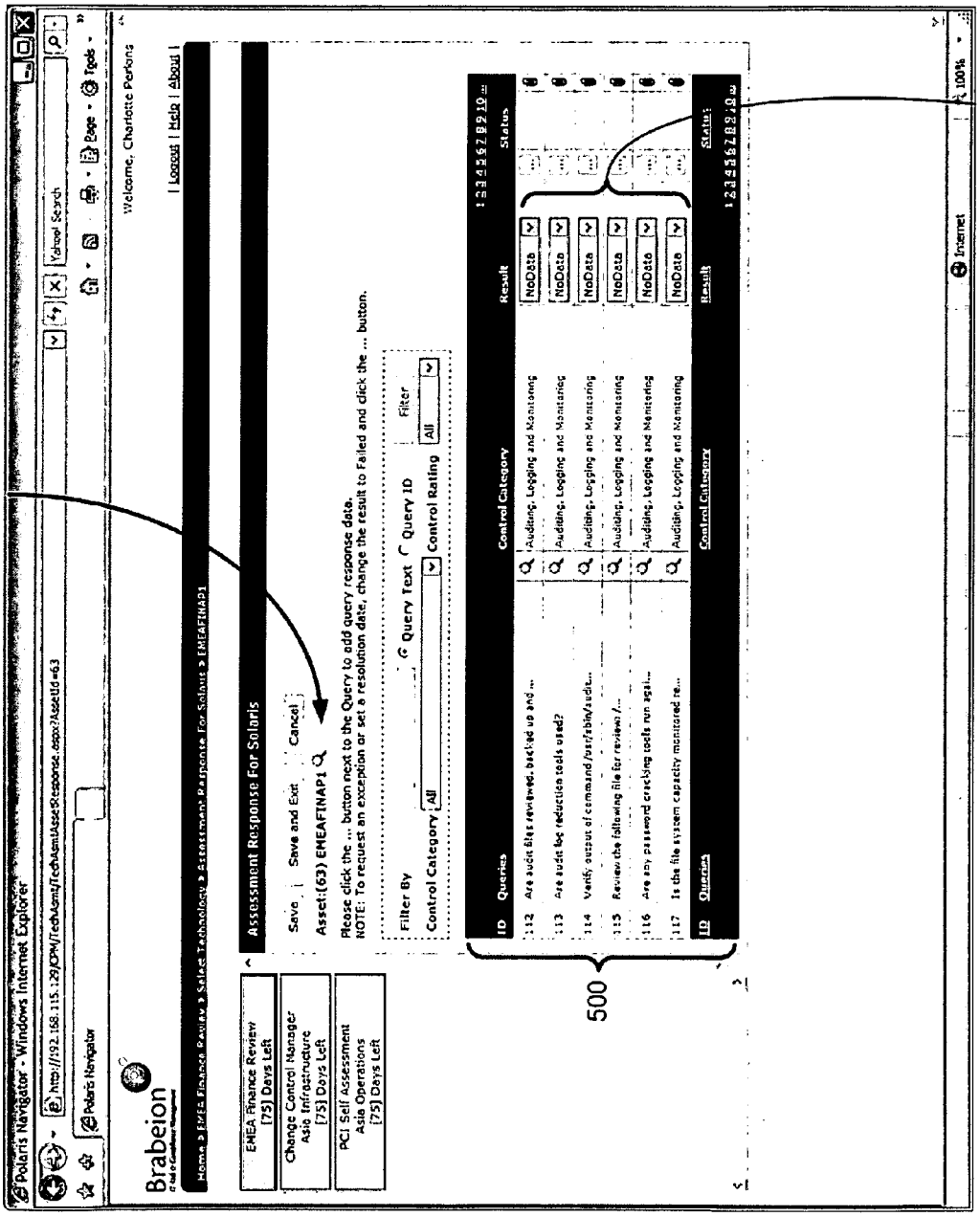
FIG. 5 is a screenshot showing the manual assessment of Controls in accordance with one embodiment of the present invention.

While assessment of Controls and Standards can be performed automatically, as shown in FIG. 4B, it can also be performed manually. FIG. 5 is a screenshot showing the manual assessment of Controls in accordance with one embodiment of the present invention. In FIG. 5, a user can manually assess Controls on an Asset-by-Asset basis. A list of queries 500 is provided for a selected Asset 502. The user can manually assess the selected Asset using the drop-down menu 504 next to each query associated with the Asset.

Figure 6:
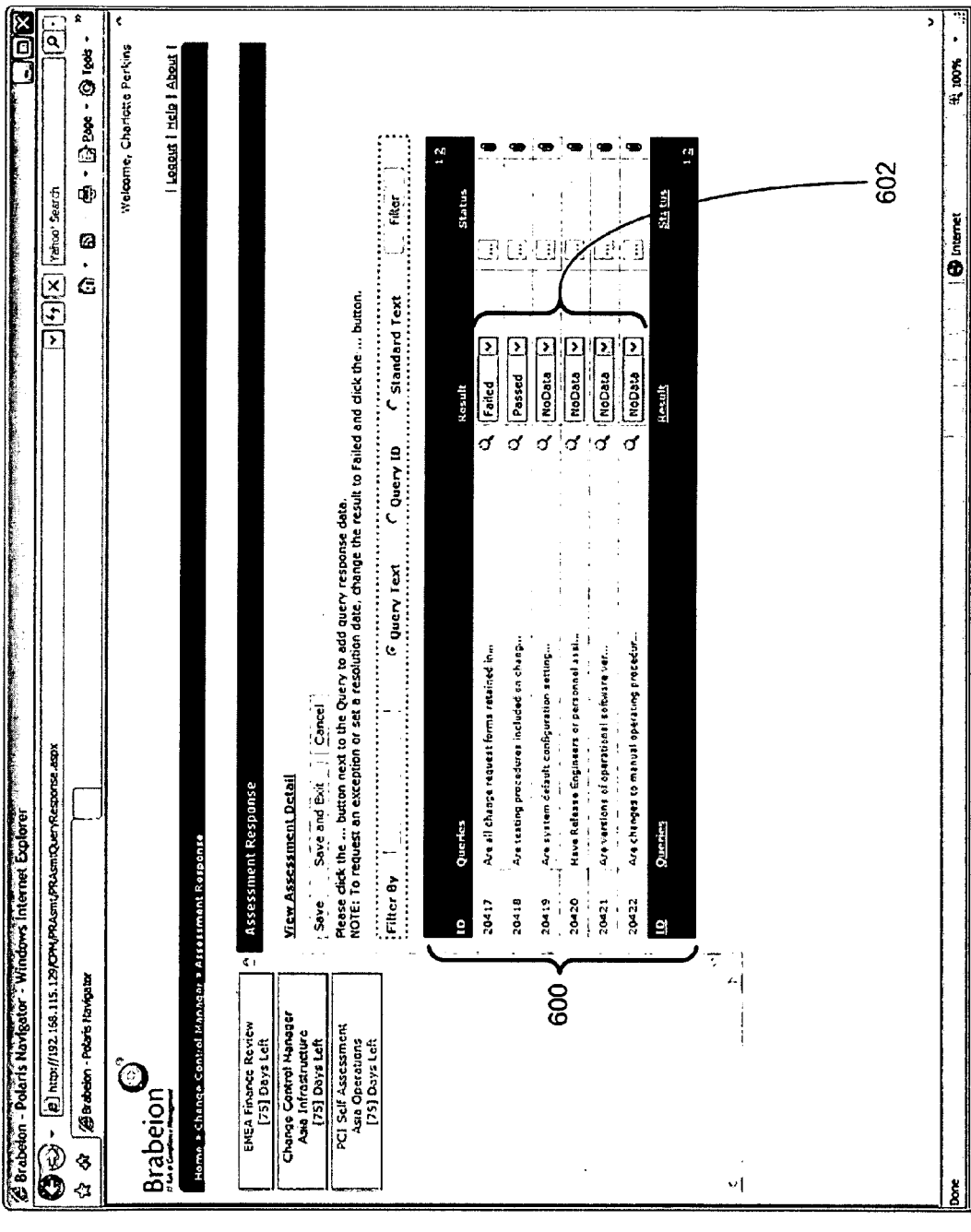
FIG. 6 is a screenshot showing the manual assessment of Standards in accordance with one embodiment of the present invention.

FIG. 6 is a screenshot showing the manual assessment of Standards in accordance with one embodiment of the present invention. In FIG. 6, a user can manually assess each Standard. A list of queries 600 is provided for a specific Standard. The user can manually assess the Standard using the drop-down menu 602 next to each query associated with the Standard.

Illustrative Embodiments

Figure 7:
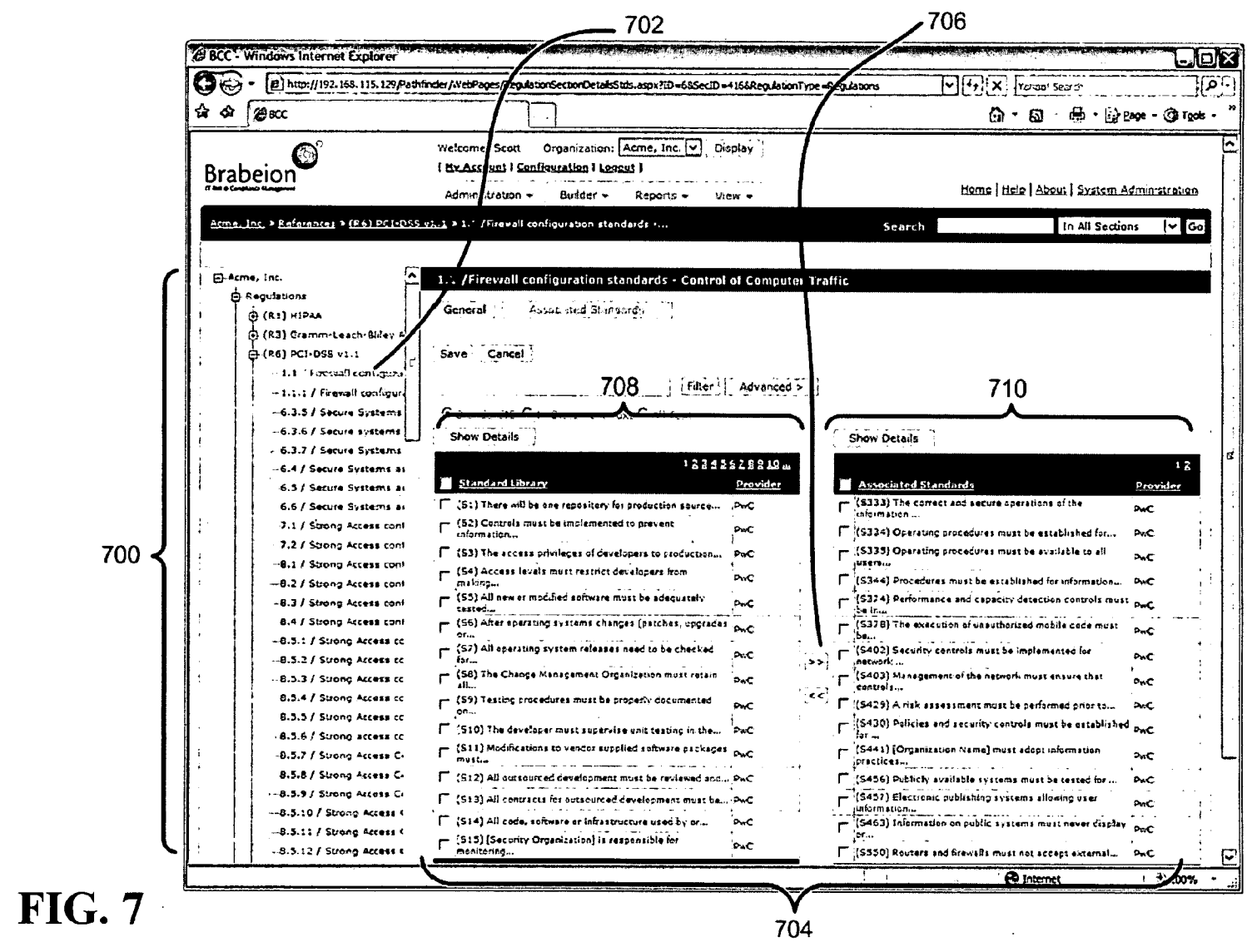

There are various ways to providing mapping of References, Standards, and Controls. Mapping can be done manually, interactively or in batch mode. For example, FIG. 7 is a screenshot showing a graphical user interface (GUI) for mapping of References to Standards in accordance with one embodiment of the present invention, whereby users can create and maintain the mapping of References to Standards. A Reference sub-window 700 shows a tree directory of the Regulations with subdirectories of Reference sections under each Regulation. The user can select a Reference in the Reference sub-window 700 by highlighting the selection 702. The user can then map or associate Standards to the selected Reference 702 in the Standards sub-window 704 by using the arrow buttons 706 to move Standards from the Standard Library column 708 to the Associated Standards column 710, or vice versa.

As shown in FIG. 2, users can specify the weight, i.e., importance, for each Reference, Standard, and Control. For example, FIG. 8 is a screenshot showing the data input for the Reference Index in accordance with one embodiment of the present invention. For a selected Reference, information regarding the regulation associated with the Reference is displayed 800. Information regarding the associated Reference is also displayed 802. The user can weigh the importance of the Reference by setting the Reference Index using a set of radio buttons 804 with values from 0 to 10, ranging from lowest to highest importance. In addition, the screenshot shows the Standards 806 associated with the Reference.

FIG. 9 is a screenshot showing the data input for the Control Index in accordance with one embodiment of the present invention. For the selected Control, information regarding the Control is displayed 900. The user can weigh the importance of the Control by setting the Control Index using a set of radio buttons 902 with values from 0 to 10, ranging from lowest to highest importance. In addition, the screenshot shows the Standards 904 associated with the Control.

FIG. 10 is a screenshot showing the data input for the Query Index in accordance with one embodiment of the present invention. Information regarding the Standard 1000, and information and query for the assessment 1002 are displayed. The user can weigh the importance of the assessment by setting the Query Index using a set of radio buttons 1004 with values from 0 to 10, ranging from lowest to highest importance.

FIG. 11 is a screenshot showing an example Standard Impact Index calculation for a specified Standard in accordance with one embodiment of the present invention. Information regarding the specific Standard is displayed 1100. Sub-window 1102 provides the Standard Reference Index, Standard Control Index, Standard Impact Index, as well as SII statistics such as Average SII, Minimum SII, Maximum SII and the number of Standards with SII. A breakdown of the References contributing to the SII is provided in sub-window 1104. Similarly, a breakdown of the Controls contributing to the SII is provided in sub-window 1106. The SII provides insight into the importance of the Standard, based on relationships to References (meeting business requirements) and Controls (impacting business operations) and assists in the management of Standards within an organization. For example, Standards with high SIIs indicate an internal business practice that has a high impact to the organization and therefore should be measured for compliance on a consistent basis.

Figure 12:
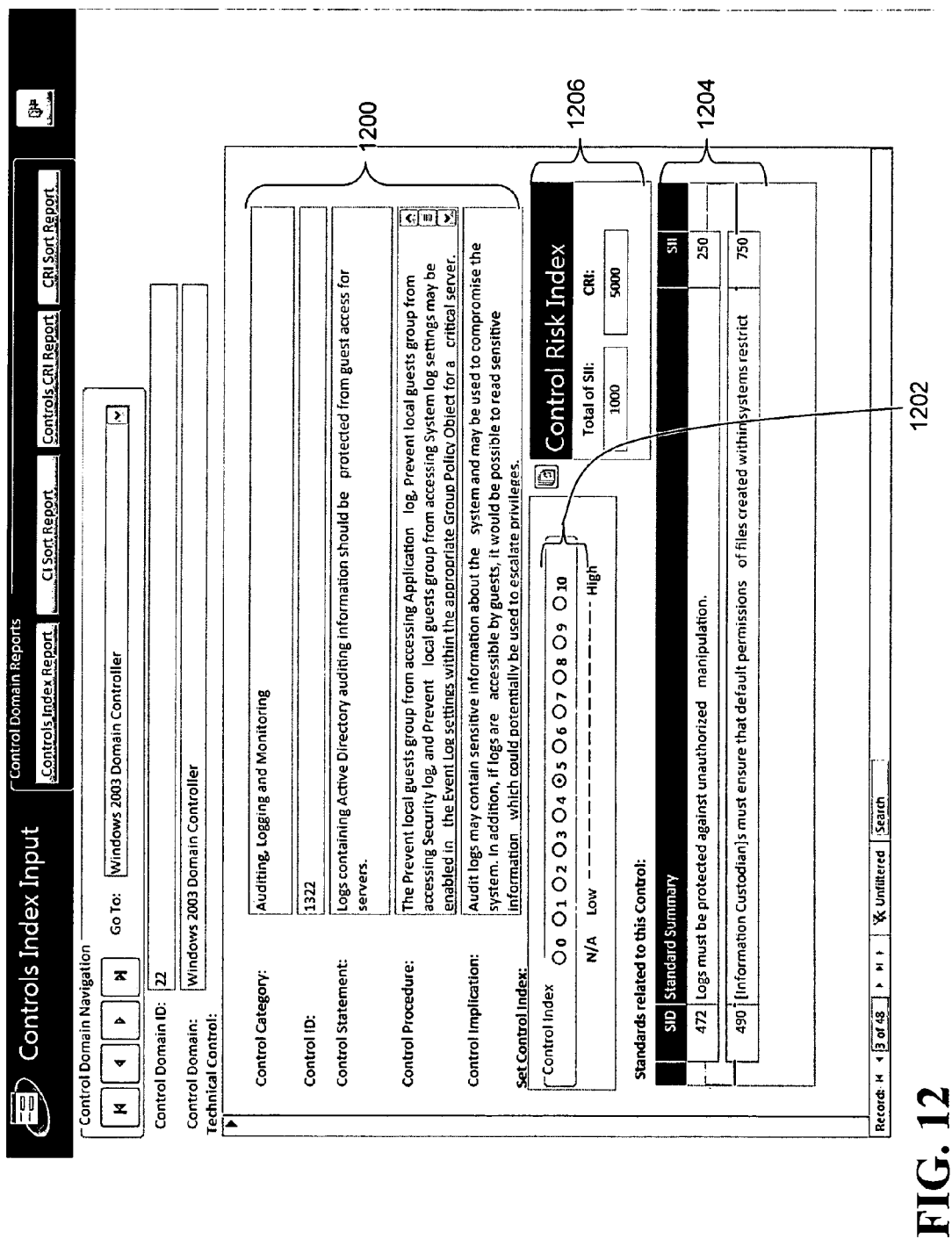
FIG. 12 is a screenshot showing the Control Risk Index calculation in accordance with one embodiment of the present invention.

FIG. 12 is a screenshot showing the CRI calculation for a specific Control in accordance with one embodiment of the present invention. Information regarding the specific Control is displayed 1200. Sub-window 1202 shows the set Control Index. Sub-window 1204 shows the Standards related to the specific Control. Sub-window 1206 shows the Total of SII and the calculated Control Risk Index. The CRI provides insight into the importance of the Control, based upon "upstream" relationships, i.e. its relationship to Standards and, via the Standards, the business requirements documented in References. For example, a Control with a high CRI indicates an internal control that is related to key internal standards or business requirements and, therefore, any failure of the control indicates a higher risk of failure to meet business or regulatory requirements.

FIG. 13 is a screenshot showing a Standards Assessment with the ACRI Multiplier. Sub-window 1300 shows the information regarding the Standard including the Standard, Standard Summary, Standard Statement, and Standard Impact Index. Sub-window 1302 shows the Standards Assessment (Query) and the Query Index (QI) for the Standard. Sub-window 1304 shows the three answers, each with a different ACRI multiplier. The QI indicates the weight of the query relative to the other queries in the assessment. The ACRI multiplier allows the user to weight the risk associated with the Query based upon the assessment response. Since some controls are not absolute, the multiplier allows the organization to calculate the relative risk based on the operational implementation of the control.

Figure 14:
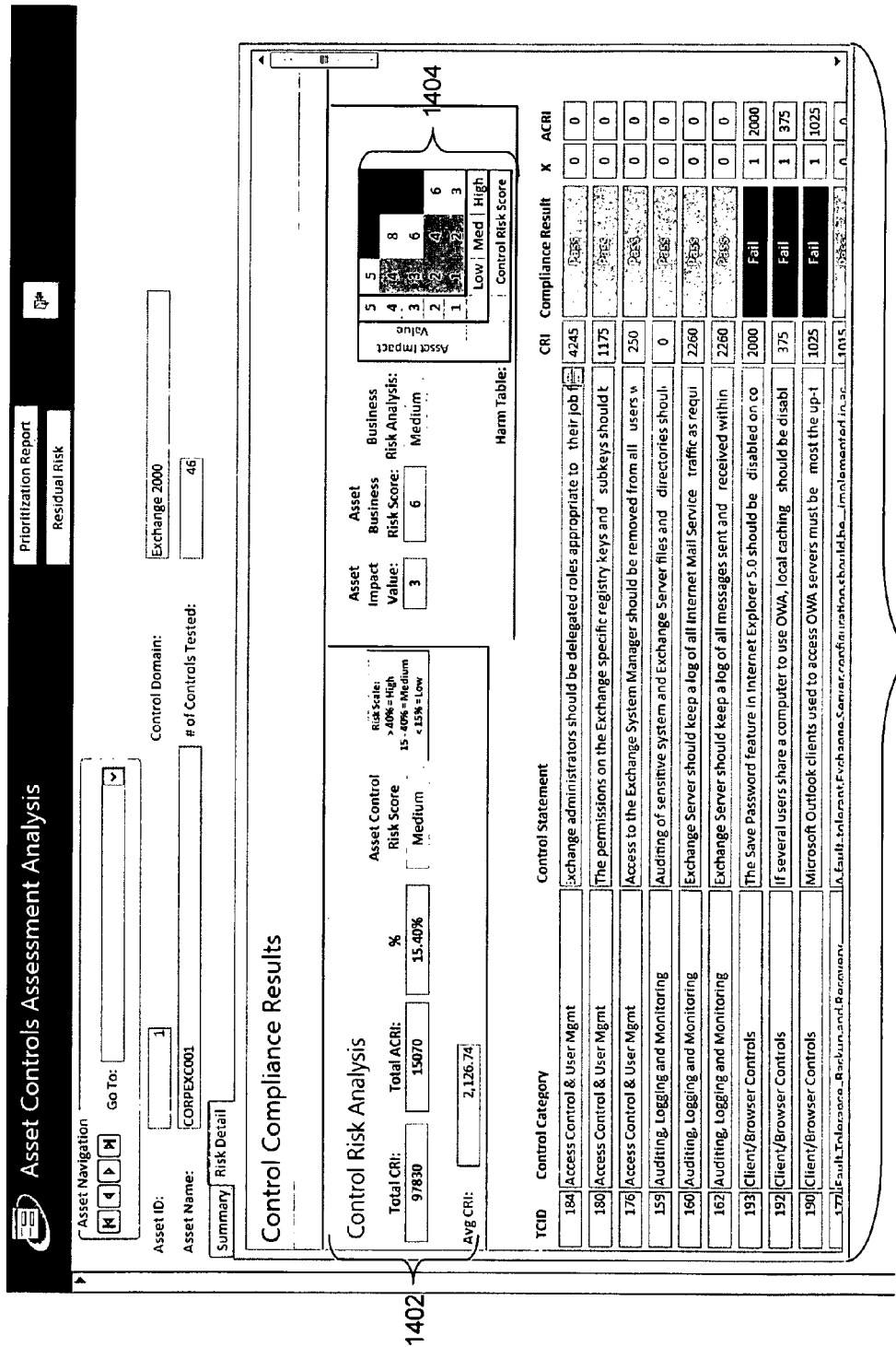
FIG. 14 is a screenshot showing a Controls-based Assessment in accordance with one embodiment of the present invention.

FIG. 14 is a screenshot showing an Asset Controls Assessment. In this screenshot, an Asset has been assessed against a set of Controls. In sub-window 1400, each Control is shown with its CRI, Compliance Result, Multiplier (X) and ACRI. The sub-window 1402 called Control Risk Analysis shows the total CRI, total ACRI, ACRI/CRI percentage and a verbal ACRS rating (High, Medium, or Low) based upon the threshold scale. Another sub-window 1404 shows the Asset Impact Value, Asset Business Risk Score, Business Risk Analysis, and Harm Table. This screenshot indicates the overall risk for one specific Asset based upon the Controls. The interface allows the user to quickly see an overall business risk score based on compliance testing. The user may, depending on that business risk score, then research and analyze the failed controls to address identified risks.

The foregoing description of embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrative embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method implemented using a computer having a processor and a database to assess compliance risks associated with a set of policies and standards of an organization, the method comprising:
   a. receiving mapping of compliance data comprising References, Standards, Controls, and Assets, wherein Standards are mapped to References, Controls are mapped to Standards, and Assets are mapped to Controls;
   b. receiving a first set of weights associated with References, which are mapped to Standards, and a second set of weights associated with the Controls, which are mapped to Standards and Assets;
   c. receiving a third set of weights associated with the Standards to be assessed, wherein the Standards are the set of policies and standards of an organization to be assessed;
   d. the processor receiving and storing in the database assessment scores of the Standards to be assessed based on their actual status;
   e. the processor retrieving the stored assessment scores of the Standards from the database and calculating a set of risk-based indices associated with the retrieved assessment scores of the Standards; and
   f. the processor calculating a set of asset assessment indices associated with the assessment scores of the Standards, wherein the set of risk-based indices comprises a standard impact index and a query risk index, whereby for each assessed Standard,
      a. the standard impact index is calculated as the sum of the first set of weights mapped to the Standard plus the sum of the second set of weights mapped to the Standard, and
      b. the query risk index is calculated as the third weight associated with the Standard multiplied by the standard impact index of the Standard.

2. A method implemented using a computer to assess compliance risks associated with a set of business and internal controls of an organization, the computer including a processor and a database, the method comprising:

a. the processor receiving and storing in the database a mapping a compliance data, including data components for each of References, Standards, Controls, and Assets, wherein Standards data components are mapped in the database to References data components, Controls data components are mapped in the database to Standards data components, and Assets data components are mapped in the database to Controls data components;

b. receiving a first set of weights associated with References data components, which are mapped to Standards data components, and a second set of weights associated with the Controls data components, which are mapped to Standards data components;

c. receiving and storing in the database assessment scores of the Controls to be assessed, wherein the Controls are the set of business and internal controls of an organization;

d. calculating a set of risk-based indices based on the first set of weights and the second set of weights; and e. the processor retrieving the stored assessment scores from the database and calculating a set of assessment indices based on the assessment scores and the risk-based indices, wherein the set of risk-based indices comprises a standard impact index and a control risk index, whereby a. for each Standard, the standard impact index is calculated as the sum of the first set of weights mapped to the Standard plus the sum of the second set of weights mapped to the Standard, and b. for each Control, the control risk index is calculated as the second weight associated with the Control multiplied by the sum of the standard impact indices of the Standards mapped to the Control.

3. The method of claim 2, wherein the set of asset assessment indices comprises an asset control risk index, an asset control risk score, and an asset business risk score.

4. The method of claim 2, wherein the act of calculating the set of assessment indices includes:
calculating, for each Control, an Asset Control Risk Index (ACRI) equal to the control risk index (CRI) of the Control times the control assessment score of the Control.

5. The method of claim 4, wherein the act of calculating the set of assessment indices further includes:
calculating, for each Control, an Asset Control Risk Score (ACRS) equal to the sum of the ACRI's for all of the Controls divided by the sum of the CRI's for all of the Controls.

6. The method of claim 2, further comprising:
receiving assessment scores of Standards to be assessed;
receiving a Query Index (QI) for each Standard to be assessed, wherein each QI specifies a weight corresponding to the importance of the respective Standard: and
calculating, for each Standard, a Query Risk Index (QRI) equal to the QI for a Standard times the standard impact index of the Standard.

7. The method of claim 6, further comprising calculating, for each Standard, an Asset Control Risk Index (ACRI) that measures risk associated with the Standard on an Asset, wherein the ACRI equals the QRI of the Standard times the assessment score of the Standard.

8. The method of claim 7, further comprising calculating, for each Standard, an Asset Control Risk Score (ACRS) equal to the sum of the ACRI for the Standard divided by the sum of the QRIs for all the Standards.

9. The method of claim 2, wherein the computer further includes a user input device and a display, and wherein the act of receiving and storing in the database the mapping of compliance data includes:
rendering, on the display, a screen view showing multiple References and multiple Standards;
accepting, via the input device, a user selection of one of the References shown on the display;
accepting, via the input device, a user selection of a set of the Standards shown on the display; and
storing in the database, a mapping between the selected Reference and each Standard of the selected set of Standards.

10. The method of claim 2, wherein the computer further includes a user input device and a display, and wherein the act of receiving the first set of weights includes, for each Reference represented by a Reference data component in the database:
rendering, on the display, a screen view showing the Reference, information about the Reference, and a region for designating a weight of the Reference;
accepting, via the input device, an input designating the weight of the Reference; and
storing the inputted weight of the Reference in the database.

11. The method of claim 2, wherein the computer further includes a user input device and a display, and wherein the act of receiving assessment scores of Controls to be assessed includes:
rendering, on the display, a screen view showing an Asset for which Controls are to be assessed and a list of queries provided for the displayed Asset;
for each query on the list of queries, accepting, via the input device, an input designating an assessment of the respective query.

12. The method of claim 2, wherein Reference data elements are mapped to Standards data elements in the database in a many-to-many mapping relationship, and wherein Standards data elements are mapped to Controls elements in the database in a many-to-many mapping relationship.

13. The method of claim 2, where multiple References data elements are stored in the database, wherein each Reference data element is mapped to a set of Standards data elements, each Standards data element is mapped to a set of Controls data elements, and each Controls data element is mapped to a set of Assets data elements.

14. A method performed by a computer for assessing compliance risks of an organization, the computer coupled to a user input device and to a database, the method comprising:
storing in the database a set of data elements relating to References, a set of data elements relating to Standards, a set of data elements relating to Controls, and a set of data elements relating to Assets;
displaying to a user a set of References stored in the database, a set of Standards stored in the database, and a set of Controls stored in the database;
receiving from the user a first selection associating at least one Standard from the displayed set of Standards with at least one Reference from the displayed set of References;
receiving from the user a second selection associating at least one Control from the displayed set of Controls with at least one Standard from the displayed set of Standards;
mapping, in the database in response to the first selection, at least one selected Reference with at least one associated selected Standard;

mapping, in the database in response to the second selection, at least one selected Standard with at least one associated selected Control;

receiving from the user a Reference Index (RI) designating a weight to be applied to at least one Reference;

receiving from the user a Query Index (QI) designating a weight to be applied to at least one mapped Reference-Standard pair;

receiving from the user a Control Index (CI) designating a weight to be applied to at least one mapped Standard-Control pair; and for at least one Standard, calculating a Query Risk Index (QRI), the QRI based upon a product of the QI associated with the Standard and a Standard Impact Index (SII), wherein the SII is calculated as the sum of the RIs of all References mapped to the Standard plus the sum of all QIs mapped to the Standard.

15. The method as recited in claim 14, wherein displaying to the user a set of References includes displaying a tree directory of regulations with subdirectories of reference sections under each regulation, and wherein the method further comprises receiving a user selection of a reference from the tree directory of regulations.

16. The method as recited in claim 14, further comprising, for at least one Control, calculating a control reference index (CRI) based on a product of the CI of the control and the sum of the SIIs of all Standards mapped to the Control.

* * * * *